June 28, 1955 J. W. GRAY ET AL 2,711,856
BOMBING COMPUTER
Filed June 7, 1945 2 Sheets-Sheet 1
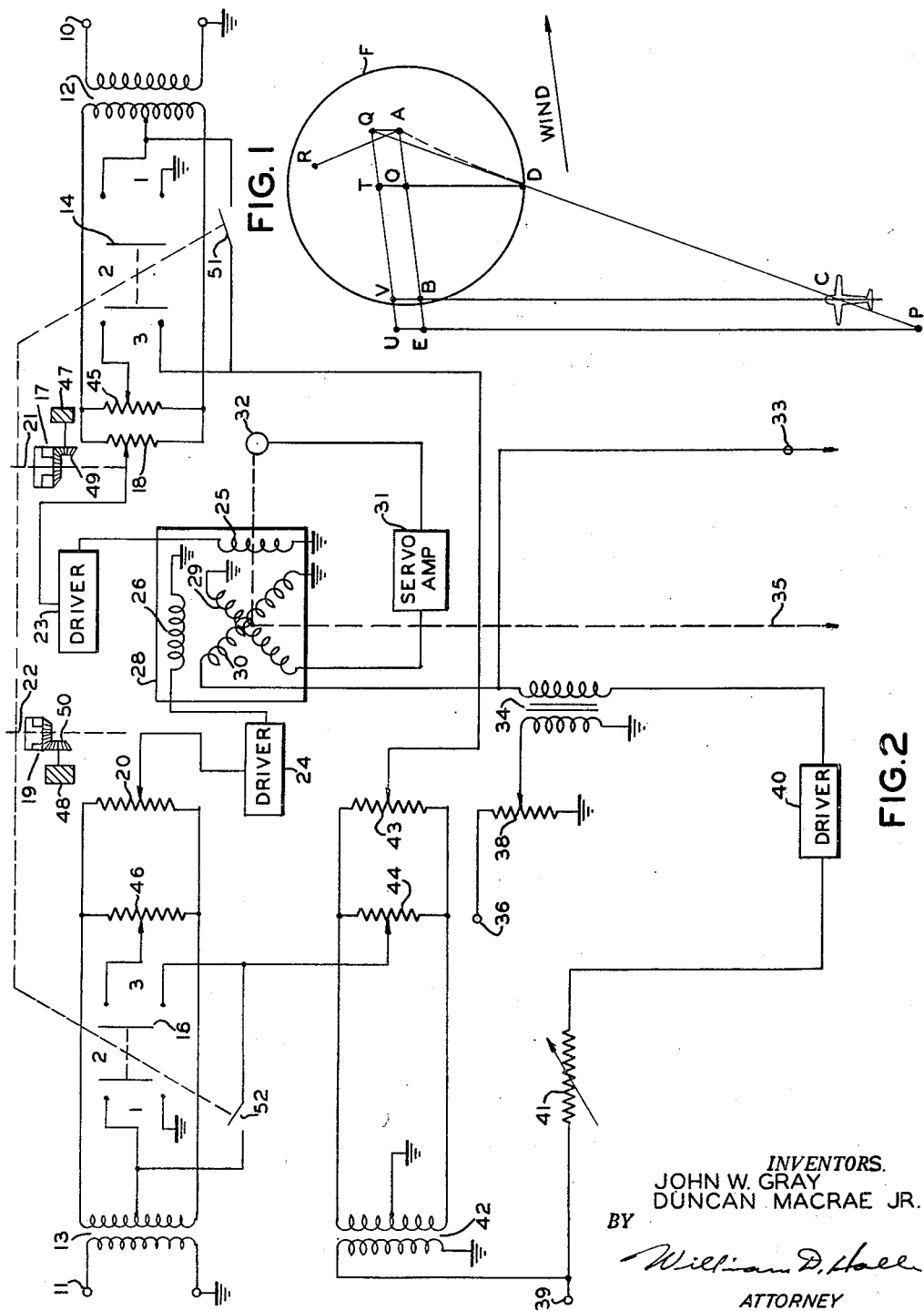
INVENTORS.
JOHN W. GRAY
DUNCAN MACRAE JR.
BY
William D. Hall
ATTORNEY INVENTOR.
JOHN W. GRAY
DUNCAN MACRAE, JR
BY Harry M. Saragovitz
Attorney

United States Patent Office 2,711,856
Patented June 28, 1955

2,711,856
BOMBING COMPUTER

John W. Gray and Duncan MacRae, Jr., Cambridge, Mass., assignors, by mesne assignments, to the United States of America as represented by the Secretary of the Air Force Application June 7, 1945, Serial No. 598,162

5 Claims. (Cl. 235—61.5)

This invention relates generally to electrical apparatus and more particularly to a computer for use in a bombing system.

It is frequently desirable to drop bombs on a target at night through overcast or under such other conditions that the target cannot be seen from the aircraft dropping the bombs.

The aircraft may be navigated to the target by a dead reckoning system in which the direction and air speed of the aircraft and the direction and velocity of the wind are integrated to give continuous indications of the position of the aircraft.

A blind bombing system may be used in connection with a radio object-locating system, so that the electrically computed position of the target may be checked by means of radio echoes. In this way errors introduced by inaccuracy in determination of the velocities and directions of the aircraft and wind may be corrected. Some targets may not give adequate radio echoes, and in such a case use may be made of an adequate reflection given by some object, the position of which is known with respect to the target. This is known as reference point bombing.

The flight to the target may be made in a series of steps, each one utilizing a different navigation point as a basis of position computation. The final step of the approach utilizes the actual target or reference point for this purpose.

In blind bombing, after the aircraft is naviated to the vicinity of the target, the aircraft must enter a bombing run which passes through a proper bomb release point and drop its bomb at said point. The bomb release point must be such a point that the bombs, if released there, will hit the target.

During the bombing run, the aircraft heads at a point designated herein as the virtual target. This virtual target is so chosen that the aircraft, by heading toward it, passes through a proper bomb release point. In one method of bombing, a stationary virtual target is used. In such a method, if any cross wind is present, the aircraft in approaching the virtual target is continually blown from its course, and hence approaches the target in a curved path.

An object of this invention is to provide a means for continuously computing the position in polar coordinates of a selected target or navigation point with respect to the aircraft. Another object is to provide a measure of the time from any instant during the bombing run until the instant at which the bomb will strike the target if the aircraft follows the plotted straight path. A further object is to provide a means for continuously computing in polar coordinates the position with respect to the aircraft of a virtual target or virtual navigation point moving with the wind velocity, so that a straight bombing run or approach may be plotted. Another object of this invention is to provide for reference point bombing a means for continuously computing the position of the reference point and from this latter information, the position of the moving virtual target with respect to the aircraft.

Another object is to allow freedom of approach to the bomb release point so that evasive action may be taken at any time up to the instant of bomb release. It is also an object to provide a means for making available information as to the proper heading of the aircraft for correct bomb release.

Other objects, features, and advantages of the invention will suggest themselves to those skilled in the art and will become apparent from the following description of the invention taken in connection with the accompanying drawing in which:

Fig. 1 is a diagram of the geometry involved in the solution of the bombing problem;

Fig. 2 is a schematic diagram of one embodiment of the invention; and

Figure 3:
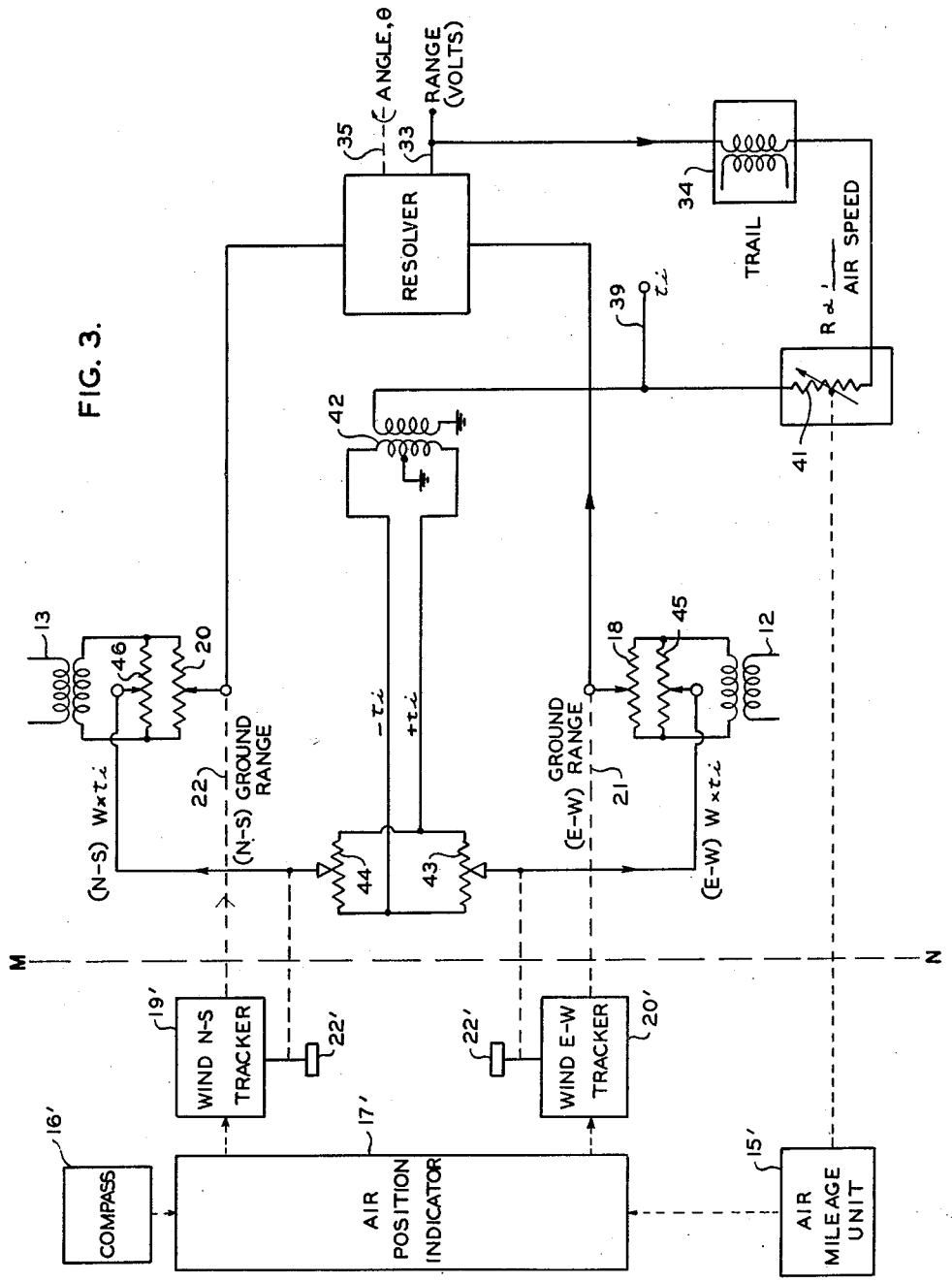
Fig. 3 is a simplified diagram of Fig. 2 together with associated apparatus.

Referring now and more particularly to Fig. 1, the approach of the plane to the target is plotted as a straight line with reference to the ground from the beginning of the bombing run at point P, to the point of release D. The aircraft C, shown at some time after leaving P, is continuously headed toward the moving virtual target B, which is moving relative to the ground with the wind velocity and moves from point E to the target A during the time from the beginning of the bombing run until the time the bomb strikes the target. The aircraft moves with the wind, and thus the ground velocity of the aircraft will be the sum of the wind vector and the vector representing the velocity of the aircraft through the air mass. These vectors are assumed to be constant in magnitude and direction during the bombing run, and hence the ground track will be a straight line PD.

The bomb is released when the aircraft is at point D on the circumference of the bombing circle F, and at that time the moving virtual target B will coincide with the center O of the bombing circle. At the time it is released, the bomb includes two component velocities, that due to the airspeed of the aircraft and that due to the wind. During the fall, the component of velocity due to wind remains unchanged, because of the continued action of the wind. The component of velocity due to airspeed of the aircraft however is progressively diminished due to air resistance. This will cause the bomb to travel a smaller distance in the direction of the airspeed of the aircraft than does the plane itself during the time of fall. The amount of this difference is known as trail.

The path of the bomb in a horizontal plane is shown by the broken line from D to A. The path of the aircraft during the same time, assuming its course remains unchanged, is along the line from D to Q. The difference QA is the trail. The distances TO, BV, and EU are also equal to the trail as can be seen from the diagram. The radius of the bombing circle F is:

$$DO = \text{airspeed} \times \text{time of fall} - \text{trail}$$

The center of the bombing circle is displaced from the target in the opposite direction to the wind by a distance:

$$AO = \text{wind speed} \times \text{time of fall}$$

The significance of the bombing circle is that with no wind, if a bomb is released anywhere on the circumference while the aircraft is headed toward the center, the bomb will strike the center. In the presence of wind, if the virtual target is upwind from the target by a distance equal to wind speed $x$ time of fall at the time the aircraft crosses the bombing circle, and if the bombs are released at that time, the bombs will hit the target.

It will be obvious that the aircraft may take evasive action at any time up to the instant it reaches the bombing circle. The distance PD may thus approach a length of zero. The diagram shown in Fig. 1 shows the straight line course to the virtual target as it is plotted at any instant and is not necessarily the path traveled by the aircraft.

A reference point R is shown, the coordinates of which are known with reference to the target A.

Referring now to Fig. 2, there is shown a partial schematic diagram of a form of the computer circuit. A source of A.-C. potential is applied between ground and terminals 10 and 11 of transformers 12 and 13 respectively. The center taps of the secondaries of these transformers may be connected through switches 14 and 16 to ground. Switches 14 and 16 are three-position switches connected so as to operate together and in conjunction with switches 51 and 52. They have an outer or No. 1 position, a central or No. 2 position in which they are shown, and an inner or No. 3 position. The outputs of transformers 12 and 13 are connected across potentiometers 18 and 20 respectively, the variable taps of these potentiometers being driven respectively by shafts 21 and 22 through friction clutches 17 and 19 respectively. These clutches each include a driving member frictionally engaging a driven member. Knobs 47 and 48 engage the driven members through bevel gears 49 and 50 respectively to allow manual adjustment of the potentiometers.

Shafts 21 and 22 are given rotational speeds proportional to the velocity components of the plane with respect to the ground in north-south and east-west directions respectively. Such shaft rotations may be obtained by any known means. One method of providing such shaft rotations is set forth in the application by Britton Chance, Serial No. 598,165, entitled "Electrical Apparatus," filed June 7, 1945. Another method of providing such shaft rotation is set forth in the application by John W. Gray, et al., (R. L. No. 63-90), Serial No. 598,160, entitled "Electrical Apparatus," filed June 7, 1945.

The output voltages of potentiometers 18 and 20 are applied to vacuum tube driver circuits 23 and 24. These vacuum tube drivers have very high input impedance and very low output impedance and may be for example of the type described in the copending application by John W. Gray, Serial No. 580,021, entitled "Electrical Circuit," filed February 27, 1945.

The drivers 23 and 24 impress their outputs on coils 25 and 26 respectively of a resolver 28. Coils 25 and 26 are perpendicular to each other and set up a field which is the resultant of the two individual fields of the coils. Resolver 28 also has a rotating armature composed of two coils 29 and 30 arranged perpendicular to each other. The output from coil 29 is fed to a servo amplifier 31, which in turn is connected to a motor 32. The voltage output from coil 30 may be taken off at terminal 33, while the displacement of the armature is transmitted through shaft 35.

The output from coil 30 also is connected to one end of the secondary of transformer 34. Potentiometer 38 is connected through terminal 36 to the same A.-C. voltage as are terminals 10 and 11. The variable tap of this potentiometer is connected to the primary of transformer 34. The other end of the secondary of transformer 34 is connected to the input of vacuum tube driver circuit 40, which may be of the same type as are driver circuits 23 and 24, having a very high input impedance and a very low output impedance. The output of driver circuit 40 is impressed through variable resistor 41 upon the primary of transformer 42, the secondary of which is center-tapped to ground and has its two ends connected to potentiometers 43 and 44 in parallel. The variable taps of potentiometers 43 and 44 may be connected through switches 14 and 16 respectively to the variable taps of potentiometers 45 and 46, which are connected in parallel with potentiometers 18 and 20 respectively.

Switches 51 and 52 are provided and arranged to be closed when switches 14 and 16 are in the No. 2 position. If switches 51 and 52 are closed, the variable taps of potentiometers 43 and 44 are connected directly to the center taps of transformers 12 and 13 respectively.

Reference is now made to Fig. 1 and Fig. 2 for the following description of the operation of the invention. Assuming first that switches 14 and 16 are in position No. 1, in which the center taps of the secondaries of transformers 12 and 13 are grounded, then two push-pull voltages are developed at the two ends of the secondaries with respect to ground and are applied across potentiometers 18 and 20. Thus as the variable contacts of these potentiometers are moved from one end to the other, the output voltages from these taps vary from a maximum amplitude in one phase through zero to a maximum amplitude in a phase 180° different from the first. If this maximum amplitude is made proportional to the maximum distance to be represented, then the output voltages from the potentiometers may be made proportional to the rectangular coordinates of any chosen point with respect to the aircraft.

At the beginning of the course utilizing the target as a basis of computation, the sliders of potentiometers 18 and 20 are manually adjusted by knobs 47 and 48 to give output voltages proportional to the known rectangular coordinates of the target A with respect to the aircraft. The rotational velocities of the shafts 21 and 22 are made respectively proportional to the components of the ground velocity of the aircraft in the directions of the rectangular coordinates as set forth above. Each of these shafts is mechanically linked to the slider of the potentiometer which measures distance in the corresponding direction. The rates of motion of the sliders of the potentiometers are thus made such that the output voltages continue to be proportional to the coordinates of the target with respect to the aircraft.

The voltages from potentiometers 18 and 20 are impressed on driver circuits 23 and 24 respectively. Since these circuits have a very high input impedance, they draw negligible current from the potentiometers, and hence permit a linear variation of output voltage with displacement of the slider. The outputs of driver circuits 23 and 24, being proportional to the coordinates of the target, are fed to stationary coils 25 and 26 respectively of resolver 28. These two coils are situated so that they are at right angles to each other, and the resultant field set up in the interior of the resolver is the vector sum of the two individual fields. The magnitude of this resultant field is equal to the square root of the sum of the squares of the two individual fields, and hence is proportional to the ground range of the target. At the same time the angle of this resultant field is equal to the azimuth of the target with respect to the aircraft.

The armature of the resolver consists of two coils 29 and 30 at right angles to each other. Coil 29 is connected to a servo amplifier 31. If any voltage is induced in coil 29, the servo amplifier increases it sufficiently so that it drives motor 32, which in turn tends to orient coil 29 so that it is at right angles to the field set up in the resolver and hence has no voltage induced in it. This servo system operates in the conventional manner well known in the art.

Since coil 29 is continually at right angles to the resultant field in the resolver, then coil 30 is continually parallel to this field, and has a voltage induced in it proportional to the magnitude of the field and hence proportional to the target range. Similarly the angle of this coil is a measure of the azimuth of the target. This voltage proportional to target range induced in coil 30 appears as an output at terminal 33, while the azimuth of the target is indicated by the position of shaft 35.

When the aircraft has approached sufficiently near the target for the start of the bombing run, it is desired to have the output of the system indicate the position of the virtual target B rather than that of the actual target A, and switches 14 and 16 are moved to position 3. This introduces feedback, which may be either positive or negative, into the circuit and hence modifies the output.

As can be seen from Fig. 1, the corrections to be added to the coordinates of A to obtain those of B are the components of the vector AB. At any time AB is equal to $Wt_i$, where W is the wind velocity vector and $t_i$ is the time of impact. The time of impact at any instant may be defined as the time interval from that instant to the instant at which the bombs strike the target assuming the aircraft flies the plotted straight line course toward the bomb release point. The rectangular components of AB are $W_x t_i$ and $W_y t_i$, where $W_x$ and $W_y$ are the $x$ and $y$ components of the wind velocity vector respectively.

From the instant the aircraft is at C until the impact of the bomb, the aircraft may be considered to move from C to V due to its airspeed and from V to Q due to the wind. Its resultant motion relative to the ground is along the line CQ. The distance CB is the range of the virtual target B which may be designated as $R_B$, and BV is the trail. It can be thus seen that $$t_i = \frac{R_B + T}{V_a}$$

where $V_a$ is the airspeed of the aircraft, and T is the trail.

The feedback voltage is coupled into the resolver input through the variable taps of potentiometers 45 and 46 which are kept at the centers of these potentiometers for normal operation. The feedback voltages are either in phase or 180° out of phase with the A.-C. voltages supplied to drivers 23 and 24 and hence either add to or subtract from them linearly. The magnitude and polarity of the feedback voltages are controlled by the settings of potentiometers 43 and 44.

For ease of explanation, we may assume that potentiometers 43 and 44 are properly set to produce the correct feedback, and hence the output from coil 30 of the resolver is proportional to the range of the virtual target B. By means of transformer 34, an additional voltage proportional to trail is added in series with the output of coil 30, and the sum is then applied to the input of the driver circuit 40. The voltage coupled into the circuit through transformer 34 is made proportional to trail by manual adjustment of potentiometer 38 according to predetermined calculations involving altitude, airspeed, and other pertinent data. The constant of proportionality is made the same as that between the output of coil 30 and range, and hence the input to driver 40 is proportional to $(R_B + T)$.

Driver 40 amplifies linearly and has a very low output impedance, and hence its output voltage is also proportional to $(R_B + T)$. The total resistance of the output circuit is made proportional to the known airspeed $V_a$, so that the current in the circuit is inversely proportional to $V_a$. This is accomplished by causing resistor 41 to vary linearly with airspeed over such a range that its resistance plus that presented by the primary of transformer 42 is proportional to $V_a$. Any inductance presented by transformer 42 may be counteracted by placing a capacitor of proper size (not shown) across the primary. Then by Ohm's law the current in the primary of transformer 42 is proportional to $$\frac{R_B + T}{V_a} \text{ or } t_i$$

The voltage across the primary of transformer 42 is also proportional to $t_i$, and this voltage may be obtained as an output at terminal 39. This voltage may be compared with a voltage proportional to time of fall to indicate the proper time at which to release the bombs.

The secondary of transformer 42 is center-tapped to ground, and hence its output consists of two push-pull voltages proportional to $t_i$. These voltages are applied to potentiometers 43 and 44 in parallel, so that the midpoints of these potentiometers are at ground potential. By moving the variable taps either side of the midpoints, voltages of varying magnitude and opposite in phase are available for feedback to potentiometers 45 and 46. The taps of potentiometers 43 and 44 may thus be set according to the direction and magnitude of the two rectangular components of wind velocity, and the two feedback voltages made proportional to $W_x t_i$ and $W_y t_i$. These voltages add or subtract from the voltages applied to drivers 23 and 24 depending on whether they are in phase or out of phase with them. The input voltages to the resolver are thus made proportional to the coordinates of the virtual target, and the output of the resolver indicates its range and azimuth.

As described above, when switches 14 and 16 are in position 1, the output of the resolver 28 indicates computed ground range and azimuth of the actual target shown as A in Fig. 1. When used in connection with a radio object-locating system, this output may be used to place reference marks on the indicator of the system and hence compare actual and computed position of the target. If the two differ, it may be caused by incorrect settings of the rates of rotation of shafts 21 and 22 and corrections may be made to compensate for this error. The manner in which the output of the computer may be used to place reference marks on the indicator of the radio object-locating system is set forth in the application by Britton Chance, referred to above.

Under some conditions, however, the target may not be observed on such an indicator, but some other object whose position with respect to the target is known may be seen. This other object may be used as a reference point, shown as R in Fig. 1. In this type of operation, the coordinates of the point R are set into the system when the aircraft starts its course utilizing the reference point as a basis of computation by adjusting potentiometers 18 and 20 as before. As the aircraft follows its course, and switches 14 and 16 are in position 1, the position of R is continually indicated by operation analogous to that previously described for continuous indication of the position of target A.

The corrections needed to convert the output from the position of reference point R to that of the virtual target B are now different however. These corrections are made in two steps. Potentiometers 45 and 46 are first set according to the coordinates of R with respect to A. This means that with no feedback, the resolver would indicate actual target position when switches 14 and 16 are thrown to position 3. Such indication is accomplished by locating the grounded points of potentiometers 45 and 46 at points displaced from the midpoints by amounts proportional to the components of the displacement of R from A. In effect this merely adds or subtracts the proper corrections from the outputs of potentiometers 18 and 20.

It is now merely necessary to convert from the coordinates of A to those of B, and this is done by throwing switches 14 and 16 to position 3 and adjusting the feedback potentiometers 43 and 44 until the feedback voltages are proportional to $W_x t_i$ and $W_y t_i$ exactly as before.

Under some conditions, it may be convenient to preset the reference point coordinates on potentiometers 45 and 46 before starting the flight, and at the same time, it may be desirable to use the feedback circuits to compute straight line approaches to navigation points on the preliminary steps of the flight. In other words, a virtual navigation point, analogous to the moving virtual target, may be used to indicate proper direction of flight for a straight line approach to the navigation point. In such a case, switches 14 and 16 are placed in position 2, switches 51 and 52 are closed, and trail is set to zero, permitting use of the feedback circuit without involving reference point offset.

Referring now more particularly to Fig. 3, the circuit of Fig. 2 is there redrawn in simplified arrangement to the right of the dot dash line MN and for the condition that switches 14 and 16 are in the number 3 or offset bombing position. The circuit is further simplified by the omission of driver units 24 and 40 and by illustration of the resolver 28 and its servo control as a block unit.

To the left of the line MN, apparatus for controlling or feeding the computer is illustrated by block diagram units taken directly from the above mentioned application of Britton Chance which was filed concurrently herewith. These units are the initial units of Fig. 1 of the Chance application and are labeled with the same identification numerals as there shown but primed to distinguish from like numerals used in the original drawings of this application. Considering now the operation of this part of the circuit the compass 16' and the air mileage unit 15' operate by means of the rotating shafts, indicated by dotted line, to feed data into the air position indicator unit 17'. The unit 17' resolves the data to supply a shaft rotation, which may be termed a vector component corresponding to N–S miles travelled, to wind tracker unit 19'. Similarly unit 17' supplies a shaft rotation, or vector component corresponding to the E–W air miles travelled, to wind tracker unit 20'. In these units 19' and 20' there are included sources simulating components of wind velocity, the magnitudes of which are adjusted by the two knobs 22' so that the output shafts 22 and 21 rotate to integrate the N–S and E–W ground miles respectively. It will be clear therefore that the slider of potentiometer 20 and the corresponding slider of potentiometer 18 are adjusted by these shafts in accordance with vector components of N–S and E–W ground miles travelled respectively. In other words, these units operate in an aircraft navigation and bombing system to provide ground range vectors corresponding to the direction coordinates of a chosen reference location on the ground relative to the craft and supply via shafts 21 and 22 these ground range vectors to the computer of the present invention.

The adjustment of the two control knobs 22', which are made in wind tracker units 19' and 20' to set the simulated wind velocity components at their proper values, are shown to move via the dotted line shafts the sliders of potentiometers 44 and 43 in a corresponding manner. It will be clear therefore that by these adjustments of the sliders of 44 and 43, a component corresponding to time of impact multiplied by the N–S wind velocity is supplied to potentiometer 46 and similarly a component proportional to the time of impact multiplied by the E–W wind velocity supply to potentimeter 45.

A shaft from air mileage unit 15' is indicated as operating to vary resistor 41 in the feed-back circuit of the computer so that this resistor varies the magnitude inversely with air speed. This arrangement is described in greater detail in the application entitled "Electrical Apparatus," Serial No. 598,161 filed concurrently herewith in the name Ivan A. Greenwood, Jr. and John W. Gray, one of the co-inventors of the present invention. In that application a suitable arrangement whereby the air mileage unit operates to vary resistor 41 inversely with air speed is shown in Fig. 3 by a generator 12 and air speed servo unit 29. This air speed servo unit is also illustrated in complete schematic diagram in Fig. 4 of that application.

In view of the complete description of the computer that has been given relative to Fig. 2 and the operation of the computer in relation to the system units described in relation to Fig. 3 it will be clear that in accordance with the present invention, in an aircraft navigation and bombing system wherein means are provided for measuring air speed and heading direction of the craft and wherein wind velocity components are provided and ground range vectors are generated corresponding to the direction coordinates of a chosen location on the ground relative to the craft, the present invention comprises a computer for converting the ground range vectors to polar coordinates of range and angle to a travelling virtual target and to provide a potential representing the time of impact of a bomb to be released at a target located relative to the chosen reference location. The computer is comprised of means responsive to the ground range vectors for producing in each of two channels A. C. potentials of magnitude and polarity to represent the ground range vectors. Also provided are means for adding in each of the channels A. C. potentials of magnitude and polarity to represent range offset components of the target relative to the mentioned location. Also provided are means for adding in each of the channels A. C. potentials corresponding to the time of impact multiplied by a factor representing the direction component of wind velocity, the last mentioned potentials representing range components of a location of a travelling virtual target relative to the actual target. There are also provided means for resolving the resultant potential outputs of both of the channels to provide an A. C. potential source representing the polar component of range and a displacement or shaft rotation representing the polar component of direction to the virtual target and a feed-back circuit is provided which couples the potential source to each of the channels and comprises means for adding to the polar A. C. potential a potential representing trail of the bomb together with means for dividing these added potentials by a factor representing air speed in order to provide a potential representing time of impact of the bomb to be dropped and means for adding the time of impact potential in each of said channels in adjusted amplitude corresponding to the direction coordinate of wind velocity to supply to each channel the potentials representing the referred to range components of the travelling virtual target.

It will be clear also that when the component of trail is omitted and the offset provided by potentiometers 46 and 45 is made zero then in accordance with the present invention, in an aircraft navigation and bombing system wherein means are provided for measuring air speed and heading direction of the craft and wherein components are produced representing wind velocity and direction and components are generated representing ground range and direction of a chosen location on the ground relative to the craft; the computer of the present invention comprises means operatively controlled by the aforementioned measuring and generating means for adding to the ground range components, similar components representing the location of a travelling virtual location relative to the chosen location together with means for resolving the added components to polar components of range and direction from the craft to the aforementioned travelling virtual location and to a potential representing time of travel to the virtual location. The computer further includes a feed-back path comprising means for modifying the polar range component inversely with the air speed of the craft and directly in accordance with the magnitude and direction of wind velocity to provide the components representing the location relative to the actual or chosen location.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In an aircraft navigation and bombing system wherein vector components are produced corresponding to ground range and direction of a chosen location on the ground relative to said craft together with components corresponding to wind direction and velocity and a control effect which varies inversely with air velocity, a computer comprising means responsive to said components for producing two voltages respectively proportional to the two rectangular coordinates of said chosen location with respect to said moving craft, means for converting said voltages into a shaft displacement proportional to the azimuth relation of the chosen location with respect to the aircraft and a third voltage proportional to the range of the chosen location with respect to the aircraft, means for modifying said third voltage by the addition of a voltage proportional to the trail of a bomb to be dropped, means for further modifying said third voltage by said control effect to give an output proportional to the time of impact, means for multiplying said output by the component of the wind velocity along one of said coordinates and applying it through corrective voltage providing means to modify the voltage proportional to said one coordinate, means for multiplying said output by the component of the wind velocity along the other of said coordinates and applying it through corrective voltage providing means to modify the voltage proportional to said other coordinate.

2. In an aircraft navigation and bombing system wherein means are provided for measuring air speed and heading direction of the craft, wind velocity components are provided and ground range vectors are generated corresponding to the direction coordinates of a chosen reference location on the ground relative to said craft, a computer for converting said ground range vectors to polar components of range and angle to a travelling virtual target and to provide a potential representing the time of impact of a bomb to be released at a target located relative to said reference location comprising; means responsive to said ground range vectors for producing in each of two channels A. C. potentials of magnitude and polarity to represent said ground range vectors, means for resolving the resultant potential outputs of both of said channels to provide an A. C. potential source representing the polar component of range and a displacement representing the polar component of direction to said virtual target, a feedback circuit coupled from said potential source to each of said channels comprising means for adding to said polar A. C. potential a potential representing trail of the bomb, means for dividing said added potentials by a factor representing air speed to provide a potential representing time of impact of the bomb to be dropped and means for adding said time of impact potential in each of said channels in adjusted amplitude corresponding to the direction coordinate of wind velocity, said potentials representing range components of a travelling virtual target relative to said actual target.

3. In an aircraft navigation and bombing system wherein means are provided for measuring air speed and heading direction of the craft, wind velocity components are produced and ground range vectors are generated corresponding to the direction coordinates of a chosen reference location on the ground relative to said craft, a computer for converting said ground range vectors to polar components of range and angle to a travelling virtual location and to provide a potential representing the time of travel to said virtual location comprising means responsive to said ground range vectors for producing in each of two channels A. C. potentials of magnitude and polarity to represent said ground range vectors, means for resolving the resultant potential output of both of said channels to provide an A. C. potential source representing the polar component of range and a displacement representing the polar component of direction to said virtual location, a feed-back circuit coupled from said potential source to each of said channels comprising means for dividing said polar potential by a factor representing air speed to provide a potential representing time of travel to said virtual location and means for adding said time of travel potential in each of said channels in adjusted amplitude corresponding to the direction coordinate of wind velocity, said potentials representing range components of said travelling virtual location relative to said reference location.

4. In an aircraft navigation and bombing system wherein means are provided for supplying to a computer ground range vector components proportional to range to a chosen location on the ground, a control effect which varies inversely with the air speed of the craft, and control factors which are proportional to magnitude and direction of wind velocity, a computer comprising means responsive to said ground range vector components for producing in each of two channels A. C. potentials of magnitude and polarity to represent said ground range vector components, means for combining and resolving said vector components to provide polar components of range and direction, a feed-back path coupling said polar component of range to each of said channels and means for introducing in said feed-back path said control effect and said wind velocity control factors effectively to control the modification of said polar components of range and direction to values representing a virtual location up wind from said chosen location.

5. A computer in accordance with claim 4 which additionally comprises means for introducing therein components corresponding to the offset location of a target relative to said chosen location and means for introducing into said feed-back path a component representing trail of a bomb to be dropped at said target whereby the polar components of range and direction are modified to values representing the location of a travelling virtual target up wind from said actual target location and means for deriving from said feed-back path a potential representing the time of impact of the bomb to be dropped.

References Cited in the file of this patent

UNITED STATES PATENTS

| 2,439,381 | Darlington et al. | Apr. 13, 1948 |
| 2,472,129 | Streeter | June 7, 1949 |

FOREIGN PATENTS

| 164,765 | Great Britain | June 23, 1921 |
| 414,995 | Great Britain | Aug. 16, 1934 |
| 476,831 | Great Britain | Dec. 16, 1937 |